D. K. TUTTLE & O. LUGO.
ICE MACHINE.
No. 111,280.                Patented Jan. 24, 1871.
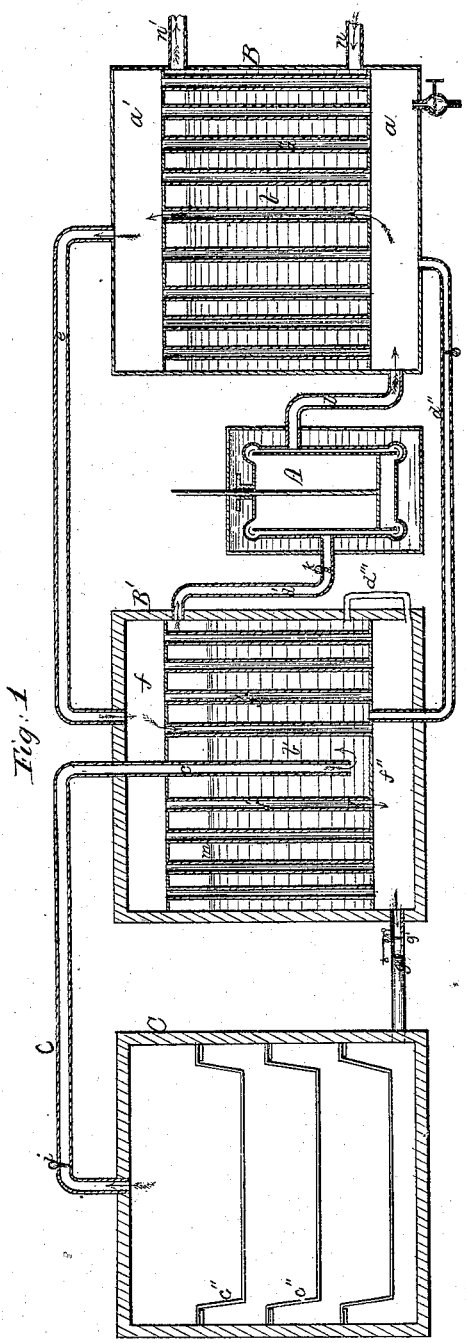

United States Patent Office.

DAVID K. TUTTLE AND ORAZIO LUGO, OF BALTIMORE, MARYLAND.

Letters Patent No. 111,280, dated January 24, 1871; antedated January 7, 1871.

IMPROVEMENT IN ICE-MACHINES.

The Schedule referred to in these Letters Patent and making part of the same.

*To all whom it may concern:*

Be it known that we, DAVID K. TUTTLE and ORAZIO LUGO, of the city and county of Baltimore, State of Maryland, have invented certain new and useful Improvements in Machines for Making Ice, of which the following is a specification.

This invention has for its object the construction of a machine in which the depression of temperature, resulting from the expansion of cooled compressed air, shall be so intensified as to produce a large quantity of ice in a more rapid and economical manner than has hitherto been accomplished in this class of machines.

This object we accomplish in a twofold manner, viz:

First, by utilizing the cold, or so-called negative heat, contained in the atmosphere drawn from the freezing-chambers in the manner hereinafter described; and Second, by causing the cooled compressed air to rarefy in direct contact with the water or other liquid to be cooled or frozen.

That the manner in which these results are attained may be more clearly explained, reference is made to the accompanying drawing.

Figure 1 is a longitudinal vertical section through the center of the apparatus.

Figure 2 is a vertical cross-section through the chambers C C'.

A, fig. 1, is a double-acting air-pump.

B is a cooler, consisting of a rectangular or circular vessel, strongly constructed, and divided into compartments $a$ $a'$ and $b$. $a$ $a'$ are connected by the tubes $a''$, for the passage of the compressed air. The space $b$ is kept filled with cold water.

B' is a cooler, of similar general construction to B.

A portion of the central tubes is omitted to allow the introduction of the tube $c$. This tube passes through the external shell of the cooler, and through the upper crown-sheet, into the cavity $b'$, where it terminates in an open end.

C C' are the freezing-chambers, which are rectangular vessels, suitably protected from external radiation, in which are placed the trays or pans $c''$ $c''$, containing the water to be frozen.

The pipe $d$ communicates with the egress-valve chamber of the pump, and conveys the compressed air into the cavity $a$ of B.

$e$ is a pipe, connecting $a'$ with $f$ in chamber B'.

$g$ is a pipe, communicating with the freezing-chambers C C'. At $g$ it carries a weighted valve, which serves to maintain the pressure in the cooling portion of the apparatus.

$h$ $h$ are pipes, which serve to convey the cold rarefied air from the first freezing-chamber to the second in the series. This, as will be seen, may be either C or C'.

The pipe $c'$ is connected with each of the chambers C C' and with $c$. By means of the cock $i$ communication may be established between either of the chambers C C' and $c$. The air which passes through $c$ bubbles up through the liquid in $b'$, abstracting the heat as well as causing agitation of the liquid. Thence the air passes through the pipe $d'$ to the pump, when it is drawn in and recompressed.

$d''$ is a connecting-pipe, provided with a stop-cock, through which any condensed moisture may be returned to the vessel $b'$.

$k$ is a vacuum-valve, which may be set so as to maintain any desired degree of rarefaction in this part of the apparatus.

The vessel or cooler B' at $b'$ being filled to about $m$ with brine or other suitable liquid, which has a very low freezing point, and not readily vaporizable, the vessel B in $b$ is filled with cold water, which is renewed as often as required through $n$, the surplus water being allowed to pass off at $n'$.

The water or other liquid to be refrigerated or cooled is placed in the trays or pans $c''$, in the chambers C C', the doors of which are now closed.

The pump being set in motion, the course of the current of air through the machine is as follows:

Compression takes place in $a$, forcing the air through the tubes $a''$ into $a'$; thence by $e$ to $f$, where it is further cooled in its passage downward through the tubes $f'$ into $f''$. Thence it passes through the valve $g$ to the chamber C or C', as may be desired.

Supposing the valves $o$ $o'$ to be so set as to admit the air to C, it will then pass on its return circuit through $h$ to $c'$, thence through $c$ to the liquid in $b'$; from this point it passes through $d'$ to the pump for recompression.

The changes which the current of air undergoes in its circuit, and the office it serves, may be thus briefly described.

The heat evolved in its compression is first obstructed as completely as practicable by the cold water which surrounds the pump A and the tubes $a''$. In passing through the tubes $f'$ the air has its temperature still further reduced by the contact of said tubes with the surrounding non-congealing liquid. This latter is kept at a very low temperature by the constant passage through it of the return current of cold rarefied air from the freezing-chambers.

When it is desired to still further intensify the cooling action of the brine upon the passing current of compressed air, a small proportion of the latter may be admitted directly into the brine through the pipe $d'''$.

The compressed air, which has now become intensely cold, leaving $f'''$, passes through the weighted valve $g$ and rarefies into the chamber C or C'. Here it rapidly abstracts the heat of fluidity from the water in $c''$ $c''$ not only by its own expansion, but also by the evaporation which it induces from the surface of the water itself.

Leaving C, the rarefied air passes into C', where it exerts a rapid cooling action on the water there exposed preparatory to perfect congelation, when C' shall assume the same relative position in the series as is now occupied by C.

From C', which is the second freezing-chamber in the case supposed, the air, being still at a very low temperature, passes back through the brine, where it again exerts its cooling action, and thence passes to the pump to again undergo the same series of changes.

When congelation is completed in C, the positions of cocks $o$ $o'$ are reversed, so as to open communication between $g$ and C'. By this change the compressed air is allowed to expand or rarefy first into the chamber C', which now becomes the first in the series of freezing-chambers. The ice having been removed from C and replaced by cold water, the cocks $g''$ and $i$ are turned so as to establish communication between C and C', and between C' and $c$. C now occupies the same relative position in the series that C did previous to this change.

Instead of allowing the return current of cold air to bubble through the brine in B', and thus come in direct contact with the same, a coil or worm may be placed in the brine, through which coil the current of cold air from C shall be caused to pass in its circuit.

Having thus described our invention,

What we claim, and desire to secure by Letters Patent of the United States, is—

1. The process herein described of producing ice by the expansion of cooled compressed air in direct contact with the water to be frozen.

2. The process described for cooling the air while under compression, the same consisting in surrounding the vessels or pipes containing the condensed air with a non-congealing liquid, which is cooled by the returning air from the ice-generator alone, or with the aid of a portion of the air previously cooled, as described.

3. The combination of the vessels B and B', the first cooled by the circulation of water, and the other by the cold non-congealing liquid, as described.

4. The combination of the vessels B B' and C, as described.

5. The combination of the vessels C and C' with their connections, so as to alternate, as described.

ORAZIO LUGO.
DAVID K. TUTTLE.

Witnesses:
N. R. HELPER,
JNO. D. PATTEN.